US010780969B2

(12) United States Patent
Zerweckh (10) Patent No.: US 10,780,969 B2
(45) Date of Patent: Sep. 22, 2020

(54) PROPULSION SYSTEM FOR A BUOYANT AERIAL VEHICLE (71) Applicant: LOON LLC, Mountain View, CA (US)

(72) Inventor: Siegfried H. Zerweckh, Berkeley, CA (US)

(73) Assignee: Loon LLC, Mountain View, CA (US)

( * ) Notice: Subject to any disclaimer, the term of this patent is extended or adjusted under 35 U.S.C. 154(b) by 348 days.

(21) Appl. No.: 15/850,824

(22) Filed: Dec. 21, 2017

(65) Prior Publication Data
US 2019/0193827 A1 Jun. 27, 2019

(51) Int. Cl.
B64B 1/24 (2006.01)
B64C 39/02 (2006.01)

(52) U.S. Cl.
CPC .............. B64B 1/24 (2013.01); B64C 39/022 (2013.01)

(58) Field of Classification Search
CPC .... B64B 1/24; B64B 1/32; B64B 1/30; B64B 1/36; B64B 1/40; B64C 39/022
USPC ........................................................ 244/96
See application file for complete search history.

(56) References Cited

U.S. PATENT DOCUMENTS

| 4,695,012 A * | 9/1987 | Lindenbaum .............. B64B 1/24 244/137.4 |
| 4,889,297 A | 12/1989 | Ikeda |
| 5,074,489 A * | 12/1991 | Gamzon ................. B64C 37/02 244/2 |
| 5,082,205 A * | 1/1992 | Caufman ................ B64C 37/02 244/2 |
| 5,518,205 A | 5/1996 | Wurst |
| 6,220,543 B1 * | 4/2001 | Uskolovsky ............ B64C 37/02 244/16 |
| 6,402,090 B1 | 6/2002 | Aaron |
| 6,422,506 B1 * | 7/2002 | Colby ..................... B63B 49/00 114/242 |
| 6,628,941 B2 | 9/2003 | Knoblach et al. |
| 7,203,491 B2 | 4/2007 | Knoblach et al. |
| 7,341,223 B2 | 3/2008 | Chu |
| 7,356,390 B2 | 4/2008 | Knoblach et al. |
| 7,469,857 B2 | 12/2008 | Voss |

(Continued)

FOREIGN PATENT DOCUMENTS

| CA | 2774443 A1 * | 3/2010 | ............... B64B 1/50 |
| CA | 2949115 A1 * | 12/2015 | .............. B64F 1/025 |

(Continued)

OTHER PUBLICATIONS

International Search Report and Written Opinion for Application No. PCT/US2018/064476 dated Mar. 29, 2019.

Primary Examiner — Christopher P Ellis
(74) Attorney, Agent, or Firm — Botos Churchill IP Law (57) ABSTRACT A buoyant aerial vehicle includes: a balloon configured to store a gas; a payload coupled to the balloon; and a propulsion unit coupled to the payload by a tether. The propulsion unit includes: a fuselage having a substantially longitudinal shape, a first end, and a second end; a primary airfoil coupled to the fuselage; a secondary airfoil coupled to the fuselage at one of the first end or the second end; and a thrust generating device disposed at one of the first end or the second end and configured to move the propulsion unit relative to the payload along a propulsion flight path. The movement of the propulsion unit imparts movement of the buoyant aerial vehicle along a vehicle flight path.

17 Claims, 7 Drawing Sheets (56) References Cited

U.S. PATENT DOCUMENTS

| | | | |
|---|---|---|---|
| 7,801,522 B2 | 9/2010 | Knoblach et al. | |
| 8,820,678 B2 | 9/2014 | DeVaul et al. | |
| 8,825,232 B2 | 9/2014 | Knoblach et al. | |
| 8,967,533 B2 | 3/2015 | DeVaul et al. | |
| 9,139,279 B2 | 9/2015 | Heppe | |
| 9,193,480 B2 | 11/2015 | Smith et al. | |
| 9,296,461 B1 | 3/2016 | Roach | |
| 9,329,600 B2 | 5/2016 | DeVaul et al. | |
| 9,409,646 B2 | 8/2016 | Fleck | |
| 9,418,243 B2 | 8/2016 | Bauer et al. | |
| 9,419,902 B1 | 8/2016 | Sites | |
| 9,420,023 B2 | 8/2016 | Ramamurthy et al. | |
| 9,519,045 B2 | 12/2016 | Knoblach et al. | |
| 9,632,503 B2 | 4/2017 | Knoblach et al. | |
| 9,836,063 B1 | 12/2017 | Bonawitz et al. | |
| 10,538,323 B2 * | 1/2020 | Rancourt | B64C 19/02 |
| 2009/0152391 A1 * | 6/2009 | McWhirk | B64B 1/02 244/30 |
| 2009/0302149 A1 * | 12/2009 | Fuchs | B64C 37/02 244/2 |
| 2010/0013226 A1 * | 1/2010 | Blumer | B64B 1/50 290/44 |
| 2010/0018566 A1 * | 1/2010 | Jackson | F24S 25/50 136/246 |
| 2010/0230968 A1 | 9/2010 | Chernyshov | |
| 2011/0192938 A1 * | 8/2011 | DiMarzio | B64B 1/50 244/53 R |
| 2012/0234965 A1 * | 9/2012 | Heppe | B64B 1/54 244/2 |
| 2012/0241554 A1 * | 9/2012 | Davidson | A01G 15/00 244/30 |
| 2012/0312919 A1 * | 12/2012 | Heppe | B64B 1/00 244/30 |
| 2014/0097289 A1 * | 4/2014 | Heppe | B64B 1/04 244/2 |
| 2015/0166165 A1 * | 6/2015 | Kelly | H02S 30/20 244/33 |
| 2016/0018823 A1 * | 1/2016 | Longmier | G05D 1/042 701/4 |
| 2017/0029111 A1 * | 2/2017 | Elson | B64D 5/00 |
| 2018/0134414 A1 * | 5/2018 | Alikouhi | F42B 15/10 |
| 2018/0304981 A1 * | 10/2018 | Piette | B64D 47/08 |
| 2019/0030447 A1 * | 1/2019 | Zima | B64D 47/08 |
| 2019/0077510 A1 * | 3/2019 | Panas | H02S 20/32 |
| 2019/0359308 A1 * | 11/2019 | Azevedo | B64B 1/50 |

FOREIGN PATENT DOCUMENTS

| | | | |
|---|---|---|---|
| EP | 1772375 A2 * | 4/2007 | B64B 1/66 |
| WO | 2017/213706 A1 | 12/2017 | |

* cited by examiner

PROPULSION SYSTEM FOR A BUOYANT AERIAL VEHICLE

BACKGROUND

Some buoyant aerial vehicles are capable of controlled flight. Such aerial vehicles rely on some form of thrusters to control lateral movement. However, such systems have substantial power requirements, whether in the form of batteries or fuel, to power the motors or engines. As such, simpler, more efficient propulsion systems for buoyant aerial vehicles could be beneficial in improving their maneuverability.

SUMMARY

According to one aspect of the present disclosure, a buoyant aerial vehicle includes: a balloon configured to store a gas; a payload coupled to the balloon; and a propulsion unit coupled to the payload by a tether. The propulsion unit includes: a fuselage having a substantially longitudinal shape, a first end, and a second end; a primary airfoil coupled to the fuselage; a secondary airfoil coupled to the fuselage at one of the first end or the second end; and a thrust generating device disposed at one of the first end or the second end and configured to move the propulsion unit relative to the payload along a propulsion flight path. The movement of the propulsion unit imparts movement of the buoyant aerial vehicle along a vehicle flight path.

In embodiments of the above aspect of the present disclosure, the tether is coupled to the primary airfoil. Tether is also coupled to a winch configured to adjust a length of the tether by which the propulsion unit extends from the payload.

In further embodiments of the above aspect of the present disclosure, at least one of the primary airfoil or the secondary airfoil includes at least one aileron. At least one of the primary airfoil or the secondary airfoil also includes at least one solar panel.

In other embodiments of the above aspect of the present disclosure, the propulsion unit includes a controller configured to actuate at least one the primary airfoil, the secondary airfoil, or the thrust generating device to move the propulsion unit relative to the payload along the propulsion flight path. The propulsion flight path may have a cyclical, reversible pattern.

In embodiments of the above aspect of the present disclosure, the thrust generating device includes an electrical motor and a propeller rotatable by the electrical motor.

In further embodiments of the above aspect of the present disclosure, a vehicle controller is included and configured to receive a movement command including at least one of a destination, direction, or speed for moving the buoyant aerial vehicle along the vehicle flight path. The propulsion unit further includes a propulsion controller configured to communicate with the vehicle controller. At least one of the vehicle controller or the propulsion controller is configured to determine the propulsion flight path that propels the buoyant aerial vehicle along the vehicle flight path.

The propulsion controller is further configured to control the primary airfoil, the secondary airfoil, and the thrust generating device.

In other embodiments of the above aspect of the present disclosure, the propulsion unit further includes a sensor configured to measure at least one flight property of the propulsion unit. The sensor is configured to transmit a measurement value corresponding to the at least one flight property to at least one of the vehicle controller or the propulsion controller.

According to another aspect of the present disclosure, a method for controlling an aerial vehicle includes: transmitting a movement command to a buoyant aerial vehicle having a propulsion unit attached thereto by a tether; determining, based on the movement command, a propulsion flight path for the propulsion unit to achieve a vehicle flight path corresponding to the movement command; and controlling at least one of a primary airfoil, a secondary airfoil, or a thrust generating device of the propulsion unit to move the propulsion unit along the propulsion flight path.

In embodiments of the above aspect of the present disclosure, the method includes: adjusting a length of a tether coupling the propulsion unit to the buoyant aerial vehicle.

In further embodiments of the above aspect of the present disclosure, the method further includes: measuring at least one flight property of the propulsion unit; and communicating a measurement of the at least one flight property to at least one of a vehicle controller of the buoyant aerial vehicle or a propulsion controller of the propulsion unit.

According to further aspect of the present disclosure, a non-transitory computer-readable storage medium storing instructions is disclosed, which, when executed by a processor, cause a computing device to: transmit a movement command to a buoyant aerial vehicle having a propulsion unit attached thereto by a tether; determine, based on the movement command, a propulsion flight path for the propulsion unit to achieve a vehicle flight path corresponding to the movement command; and control at least one of a primary airfoil, a secondary airfoil, or a thrust generating device of the propulsion unit to move the propulsion unit along the propulsion flight path.

In embodiments of the above aspect of the present disclosure, the computing device is further caused to: control a winch to adjust a length of a tether coupling the propulsion unit to the buoyant aerial vehicle.

In further embodiments of the above aspect of the present disclosure, the computing device is further caused to: determine at least one flight property of the propulsion unit; and communicate a measurement of the at least one flight property to at least one of a vehicle controller of the buoyant aerial vehicle or a propulsion controller of the propulsion unit.

BRIEF DESCRIPTION OF THE DRAWINGS

Various aspects and features of the present systems and methods for controlling an aerial vehicle are described herein below with references to the drawings, wherein.

DETAILED DESCRIPTION

The present disclosure is directed to systems and methods for propelling a buoyant aerial vehicle. In embodiments, the buoyant aerial vehicle includes a wing-based propulsion unit that is attached to a payload of the aerial vehicle, such that the propulsion unit is suspended from the payload, e.g., by a tether. The propulsion unit is powered by a thrust generating device, such as an electrically powered propeller. The propulsion unit is configured to perform a cyclically reversing flight path, thereby generating movement along the swing line of the propulsion unit, which in turn generates lift. The lift vector of the propulsion unit is controlled by adjusting the direction and/or speed of the propulsion unit, which in turn allows for controlling steering and propulsion of the buoyant aerial vehicle.

Although the present disclosure makes particular reference to superpressure balloons, which are designed to float at an altitude in the atmosphere where the density of the balloon system is equal to the density of the atmosphere, this is being used for illustrative purposes only. The propulsion system according to the present disclosure may be used with any vehicles that maintain altitude at least in part by using buoyancy, such as other types of balloons, airships, and the like.

Figure 1:
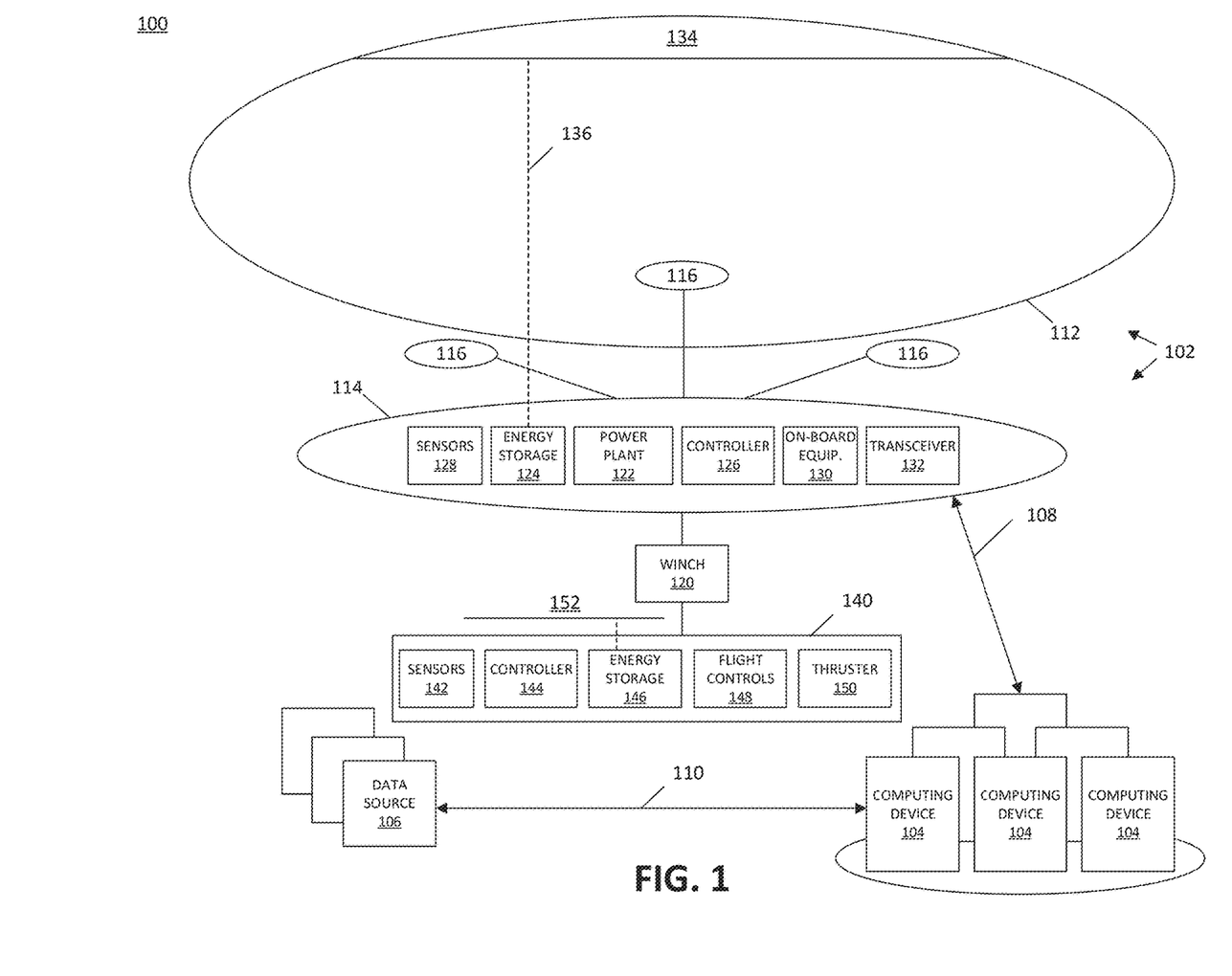
FIG. 1 is a schematic diagram of an illustrative aerial vehicle system, in accordance with an embodiment of the present disclosure.

With reference to FIG. 1, an illustrative aerial vehicle system 100 includes an aerial vehicle 102, one or more computing devices 104, and one or more data sources 106. The aerial vehicle 102 and the computing devices 104 are communicatively coupled to one another by way of a wireless communication link 108, and the computing devices 104 and the data sources 106 are communicatively coupled to one another by way of wired and/or wireless communication link 110. In some aspects, the aerial vehicle 102 is configured to be launched into and moved about the atmosphere, and the computing devices 104 cooperate as a ground-based distributed array to perform their functions described herein. The data sources 106 may include airborne data sources, such as airborne weather balloons, additional airborne aerial vehicles 102, and/or the like, and/or ground-based data sources, such as publicly available and/or proprietary databases, examples of which are the Global Forecast System (GFS) operated by the National Oceanic and Atmospheric Administration (NOAA), as well as databases maintained by the European Center for Medium-range Weather Forecasts (ECMWF). Although the present disclosure is provided in the context of an embodiment where the system 100 includes multiple computing devices 104 and multiple data sources 106, in other embodiments the system 100 may include a single computing device 104 and a single data source 106. Further, although FIG. 1 shows a single aerial vehicle 102, in various embodiments the system 100 includes a fleet of multiple aerial vehicles 102 that are positioned at different locations throughout the atmosphere and that are configured to communicate with the computing devices 104, the data sources 106, and/or one another by way of the communication links 108 and/or 110.

In various embodiments, the aerial vehicle 102 may be configured to perform a variety of functions or provide a variety of services, such as, for instance, telecommunication services (e.g., Long Term Evolution (LTE) service), hurricane monitoring services, ship tracking services, services relating to imaging, astronomy, radar, ecology, conservation, and/or other types of functions or services. Computing devices 104 control the position (also referred to as location) and/or movement of the aerial vehicles 102 throughout the atmosphere or beyond, to facilitate effective and efficient performance of their functions or provision of their services, as the case may be. As described in further detail herein, the computing devices 104 are configured to obtain a variety of types of data from a variety of sources and, based on the obtained data, communicate messages to the aerial vehicle 102 to control its position and/or movement during flight.

With continued reference to FIG. 1, the aerial vehicle 102 includes a lift gas balloon 112, one or more ballonets 116, and a payload or gondola 114, which is suspended beneath the lift gas balloon 112 and/or the ballonets 116 while the aerial vehicle 102 is in flight. The ballonets 116 may be used to control the buoyancy, and thereby the altitude, of the aerial vehicle 102 during flight. In some aspects, the ballonets 116 include air and the lift gas balloon 112 includes a lifting gas that is lighter than air. As shown in FIG. 1, the ballonets 116 may be positioned inside the lift gas balloon 112 and/or outside the lift gas balloon 112. An vehicle controller 126 controls a pump and a valve (neither of which are shown in FIG. 1) to pump air into the ballonets 116 (from air outside the aerial vehicle 102) to increase the mass of the aerial vehicle 102 and lower its altitude, or to release air from the ballonets 116 (into the atmosphere outside the aerial vehicle 102) to decrease the mass of the aerial vehicle 102 and increase its altitude. The combination of the vehicle controller 126, the lift gas balloon 112, the ballonets 116, and the valves and pumps (not shown in FIG. 1) is referred to as an air-gas altitude control system (ACS).

The aerial vehicle 102 also includes one or more solar panels 134 affixed thereto. As shown in FIG. 1, the solar panels 134 may be affixed to an upper portion of the lift gas balloon 112 that absorbs sunlight, when available, and generate electrical energy from the absorbed sunlight. Alternatively, or in addition, the solar panels 134 may be affixed to the gondola 114 or elsewhere to aerial vehicle 102 (not shown in FIG. 1). The solar panels 134 provide, by way of power paths such as power path 136, the generated electrical energy to the various components of the aerial vehicle 102, such as components housed within the gondola 114, for utilization during flight.

The gondola 114 includes a variety of components, some of which may or may not be included, depending upon the application and/or needs of the aerial vehicle 102. Although not expressly shown in FIG. 1, the various components of the aerial vehicle 102 in general, and/or of the gondola 114 in particular, may be coupled to one another for communication of power, data, and/or other signals. The exemplary gondola 114 shown in FIG. 1 includes one or more sensors 128, an energy storage module 124, a power plant 122, a vehicle controller 126, a transceiver 132, and other on-board equipment 130. The transceiver 132 is configured to wirelessly communicate data between the aerial vehicle 102 and the computing devices 104 and/or data sources 106 by way of the wireless communication link 108 and/or the communication link 110, respectively.

In some embodiments, the sensors 128 include a global positioning system (GPS) sensor that senses and outputs location data, such as latitude, longitude, and/or altitude data corresponding to a latitude, longitude, and/or altitude of the aerial vehicle 102 in the Earth's atmosphere. The sensors 128 are configured to provide the location data to the computing devices 104 by way of the wireless transceiver 132 and the wireless communication link 108 for use in controlling the aerial vehicle 102, as described in further detail below.

The energy storage module 124 includes one or more batteries that store electrical energy provided by the solar panels 134 for use by the various components of the aerial vehicle 102. The power plant 122 obtains electrical energy stored by the energy storage module 124 and converts and/or conditions the electrical energy to a form suitable for use by the various components of the aerial vehicle 102.

The vehicle controller 126 is configured to control the ballonets 116 to adjust the buoyancy of the aerial vehicle 102 to assist in controlling its position and/or movement during flight. As described in further detail below, in various embodiments the vehicle controller 126 is configured to control the ballonets 116 based at least in part upon an altitude command that is generated by, and received from, the computing devices 104 by way of the wireless communication link 108 and the transceiver 132. In some examples, the vehicle controller 126 is configured to implement the altitude command by causing the actuation of the ACS based on the altitude command.

The on-board equipment 130 may include a variety of types of equipment, depending upon the application or needs, as outlined above. For example, the on-board equipment 130 may include LTE transmitters and/or receivers, weather sensors, imaging equipment, and/or any other suitable type of equipment.

Figure 4A:
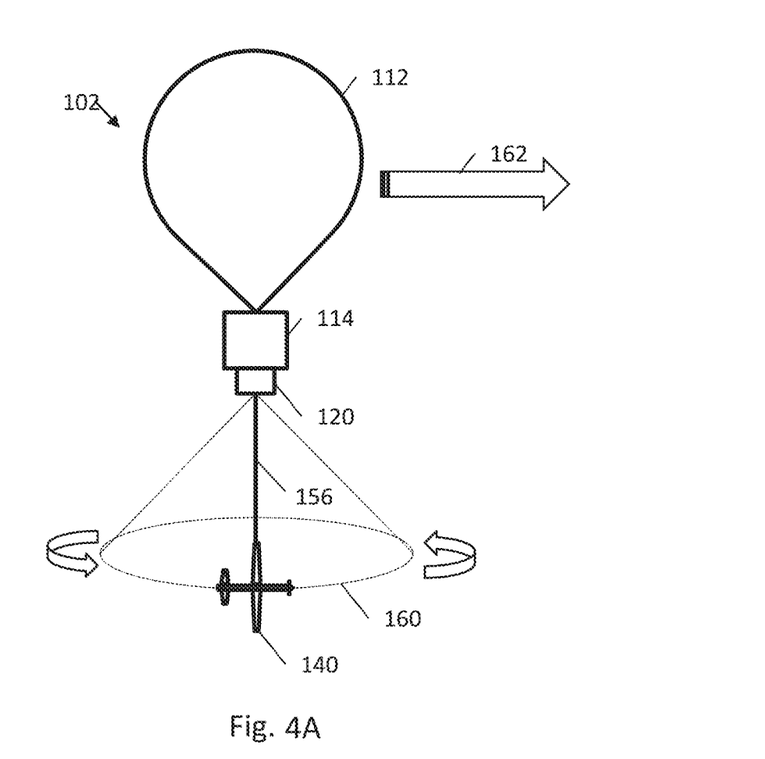
FIG. 4A is a schematic diagram of the aerial vehicle system of FIG. 1 illustrating a propulsion flight path of a propulsion unit in accordance with an embodiment of the present disclosure.
Figure 4B:
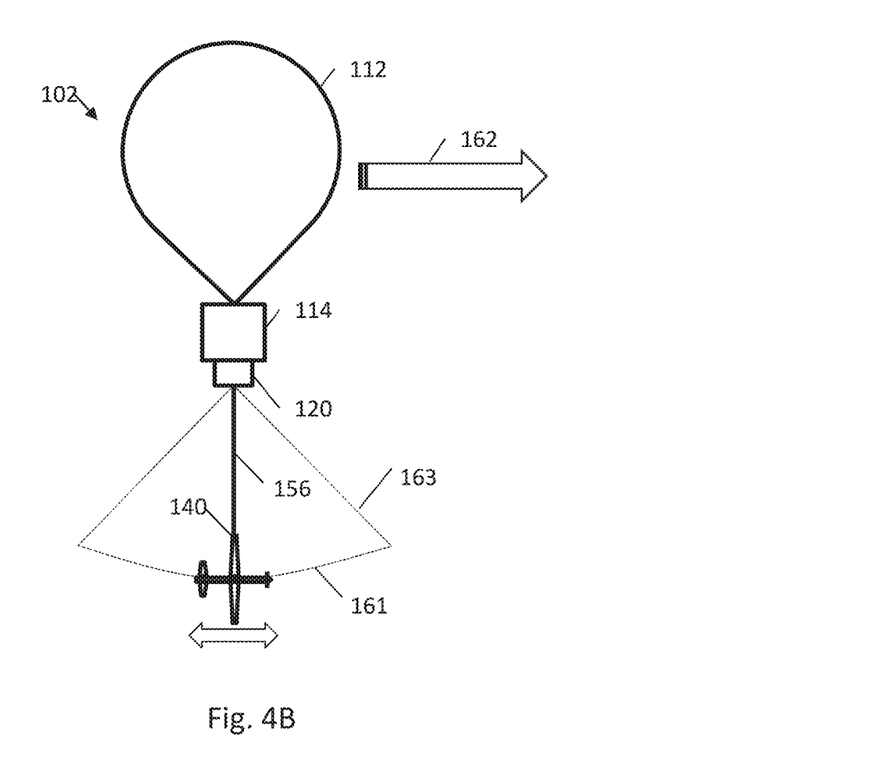
FIG. 4B is a schematic diagram of the aerial vehicle system of FIG. 1 illustrating a propulsion flight path of a propulsion unit in accordance with another embodiment of the present disclosure.
Figure 6:
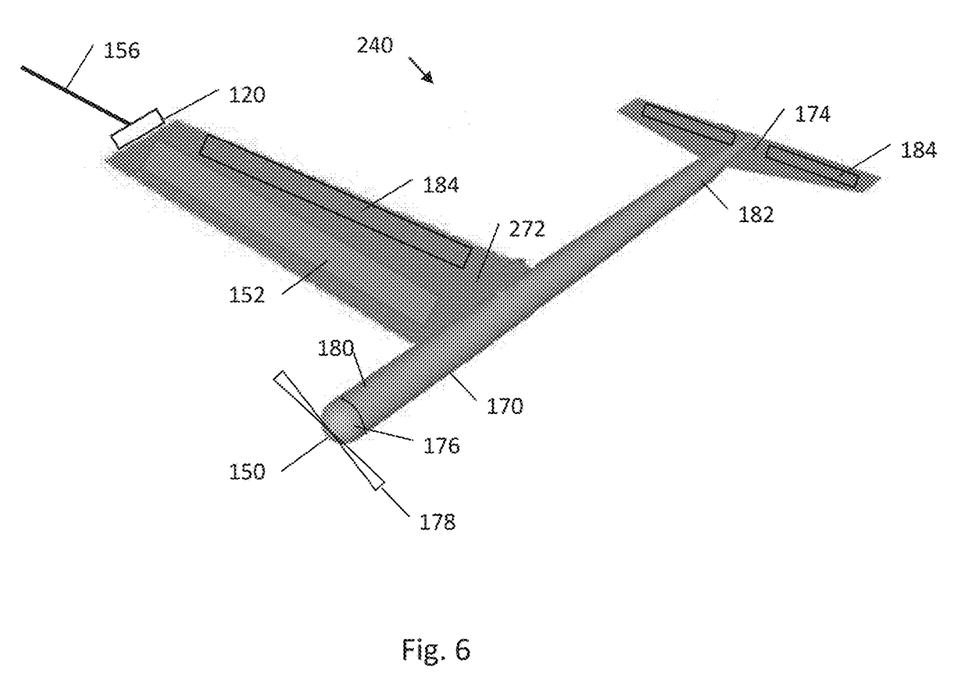
FIG. 6 is a perspective view of a propulsion unit of the aerial vehicle system of FIG. 1 in accordance with another embodiment of the present disclosure.

In addition to the aforementioned components, the gondola 114 is also coupled a propulsion unit 140. The propulsion unit 140 is attached to the gondola 114 by a winch 120, which allows for controlling the distance between the propulsion unit 140 and the aerial vehicle 102. The winch 120 may be coupled to the gondola 114 as shown in FIGS. 4A and 4B. In embodiments, the winch 120 may be coupled to the propulsion unit 140 as shown in FIG. 6.

The propulsion unit 140 includes one or more sensors 142, a propulsion controller 144, energy storage 146, flight controls 148, and a thruster 150. The energy storage 146, which may be any suitable electrical battery, is coupled to one or more solar panels 152 attached the propulsion unit 140.

Figure 2:
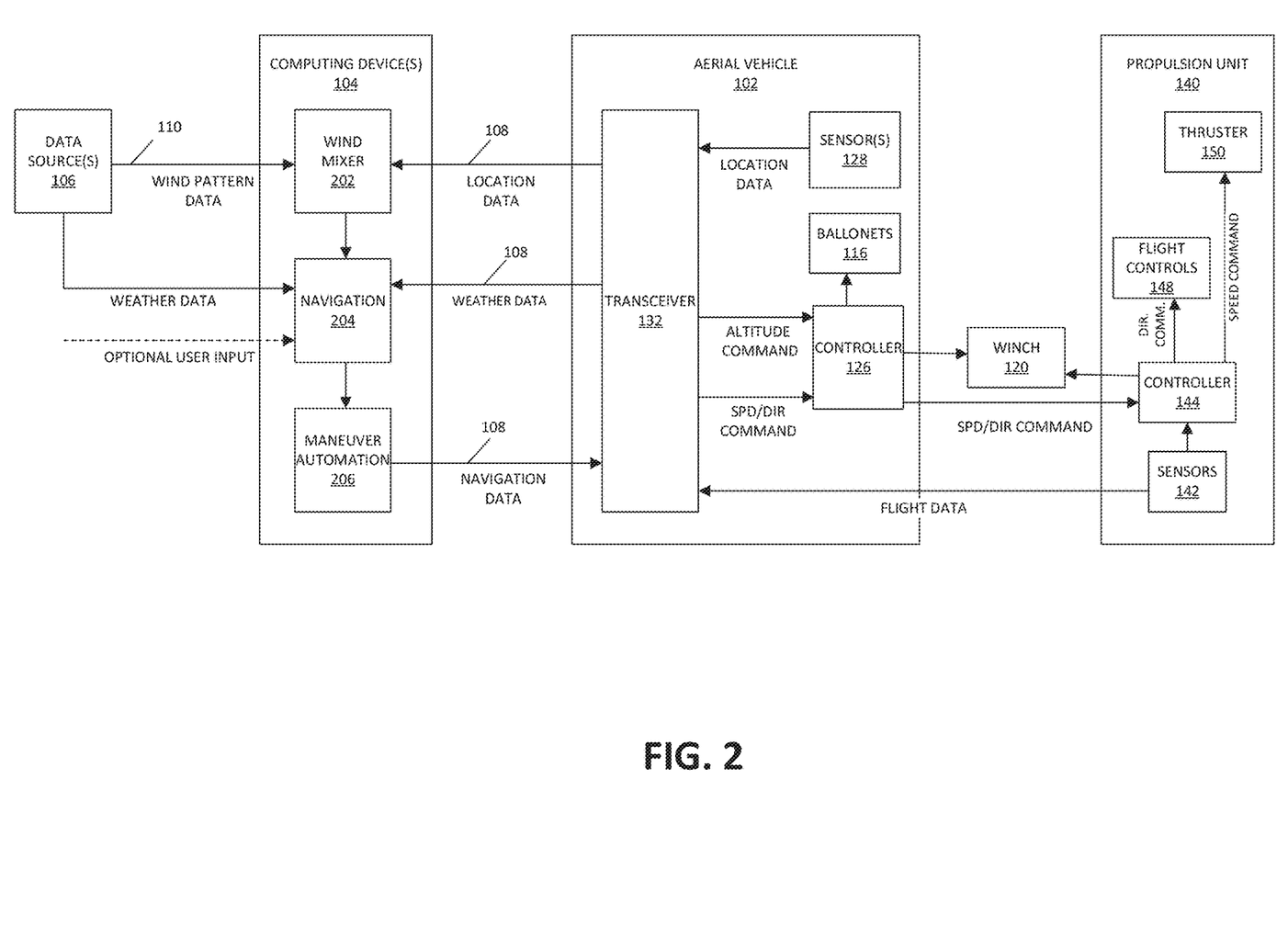
FIG. 2 is a schematic diagram showing additional aspects of the aerial vehicle system of FIG. 1, in accordance with an embodiment of the present disclosure.

Having provided an overview of the aerial vehicle system 100 in the context of FIG. 1, reference is now made to FIG. 2, which shows certain operations of the aerial vehicle system 100, in accordance with an embodiment of the present disclosure. In particular, FIG. 2 illustrates an exemplary embodiment of corresponding components are allocated among the aerial vehicle 102, the computing devices 104, and/or the data sources 106, to control a position and/or movement of the aerial vehicle 102 and how they function. The arrangement of components depicted in FIG. 2 is provided by way of example and not limitation. Other arrangements of components and allocations of functionality are contemplated, for instance, with the aerial vehicle 102 including components that implement functionality shown in FIG. 2 as being implemented by the computing devices 104, or vice versa. However, in the example shown in FIG. 2, a majority of components and functionality are allocated to the computing devices 104 instead of to the aerial vehicle 102, which decreases the amount of energy required to operate the components of the aerial vehicle 102 and thus enables the components of the aerial vehicle 102 to utilize a greater portion of the available energy than would be possible if more components and functionality were allocated to the aerial vehicle 102. This increases the capabilities of the aerial vehicle 102 for implementing functionality and/or providing services for a given amount of available energy.

In addition to certain components that were introduced above in connection with FIG. 1, FIG. 2 shows a wind mixer module 202, a navigation module 204, and a maneuver automation module 206 that are included within the computing devices 104. Once the aerial vehicle 102 is in flight in the atmosphere, the sensors 128 are configured to periodically transmit to the wind mixer module 202, by way of the transceiver 132 and the wireless communication link 108, location data, such as time stamped GPS positions and altitudes of the aerial vehicle 102 at corresponding times. The wind mixer module 202 utilizes the location data obtained from the sensors 128 and wind pattern data obtained from other data sources 106 (such as National Oceanic and Atmospheric Administration (NOAA) data sources, European Centre for Medium-Range Weather Forecasts (ECMWF) data sources, and/or the like) to infer or estimate the winds in which the aerial vehicle 102 is flying or is expected to be flying. In particular, wind points are stored in the wind mixer module 202, which constructs a kernel function, such as a Gaussian Process kernel function that assists the navigation module 204 in determining how to navigate the aerial vehicle 102 based on the inferred or estimated winds, according to one or more predetermined navigation algorithms. Depending upon the navigation algorithm being implemented, the navigation module 204 generates a maneuver plan (e.g., navigation data), which is a set of locations (e.g., altitudes, latitude coordinates, and/or longitude coordinates) that the aerial vehicle 102 should attempt to attain at corresponding times. Additionally, the navigation module 204 receives weather data, including ambient temperature conditions and/or predictions, from the data sources 106 and/or from the sensors 128 via the transceiver 132. Based on the temperature predictions, the navigation module 204 may determine adjustments to the maneuver plan including commands to the propulsion unit 140 to implement the maneuver plan, as further described below. The navigation module 204 then registers the maneuver plan with the maneuver automation module 206.

The maneuver automation module 206 sequentially transfers each item of location data (e.g., altitude, latitude, and/or longitude) to the vehicle controller 126 for implementation according to the corresponding times indicated in the maneuver plan. In particular, the maneuver automation module 206 transmits to the transceiver 132, by way of the wireless communication link 108, a movement command, which includes an altitude command (for example, which may be specified as a barometric pressure, which may be equivalent to pressure altitude, and which indicates a desired altitude for the aerial vehicle 102 to maintain within some tolerance band) and/or a speed and direction command. The vehicle controller 126 is configured to execute a loop whereby the vehicle controller 126 periodically receives the altitude command and/or a speed and direction command from the computing devices 104 and executes those commands to control the altitude as well as direction and speed of the aerial vehicle 102.

With respect to the speed and direction command, the vehicle controller 126 transmits the command to the propulsion controller 144 of the propulsion unit 140. The propulsion controller 144 then determines how to best implement the speed and direction command to move the aerial vehicle 102. In particular, the propulsion unit 140 signals the flight controls 148 and the thruster 150 to move the propulsion unit 140 in a propulsion flight path 160, which would result in propulsion of the aerial vehicle 102 along a vehicle flight path 162 (FIGS. 4A and 4B). In addition, the vehicle controller 126 and/or the propulsion controller 144 are coupled to the winch 120 and are configured to control the winch 120 to adjust the distance that the propulsion unit 140 extends from the aerial vehicle 102.

Figure 3:
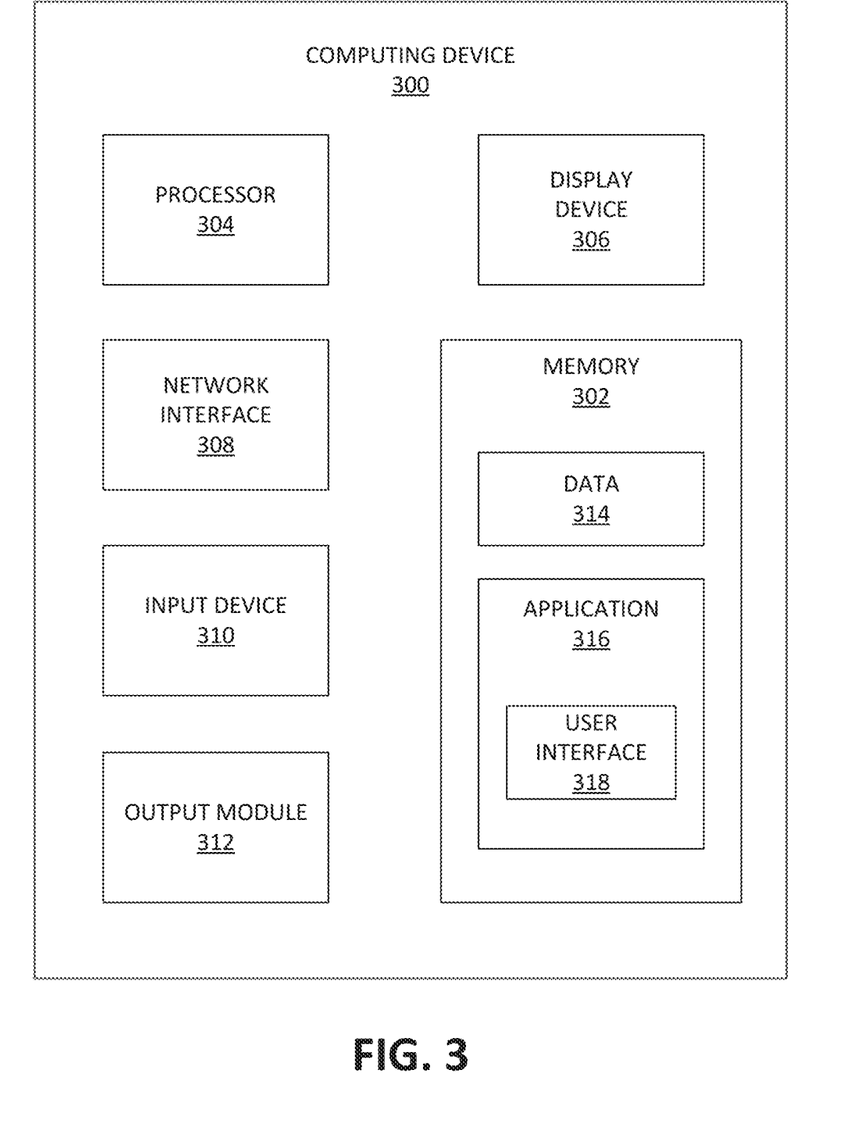
FIG. 3 is a schematic block diagram of an illustrative embodiment of a computing device that may be employed in various embodiments of the present system, for instance, as part of the system or components of FIG. 1 or 2, in accordance with an embodiment of the present disclosure.

FIG. 3 is a schematic block diagram of a computing device 300 that may be employed in accordance with various embodiments described herein. Although not explicitly shown in FIG. 1 or FIG. 2, in some embodiments, the computing device 300, or one or more of the components thereof, may further represent one or more components (e.g., the computing device 104, components of the gondola 114, the data sources 106, the propulsion unit 140 and/or the like) of the system 100. The computing device 300 may, in various embodiments, include one or more memories 302, processors 304, display devices 306, network interfaces 308, input devices 310, and/or output modules 312. The memory 302 includes non-transitory computer-readable storage media for storing data and/or software that is executable by the processor 304 and which controls the operation of the computing device 300. In embodiments, the memory 302 may include one or more solid-state storage devices such as flash memory chips. Alternatively, or in addition to the one or more solid-state storage devices, the memory 302 may include one or more mass storage devices connected to the processor 304 through a mass storage controller (not shown in FIG. 3) and a communications bus (not shown in FIG. 3). Although the description of computer readable media included herein refers to a solid-state storage, it should be appreciated by those skilled in the art that computer-readable storage media may be any available media that can be accessed by the processor 304. That is, computer readable storage media includes non-transitory, volatile and non-volatile, removable and non-removable media implemented in any method or technology for storage of information such as computer-readable instructions, data structures, program modules or other data. Examples of computer-readable storage media include RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which may be used to store the desired information and which can be accessed by computing device 300.

In some embodiments, the memory 302 stores data 314 and/or an application 316. In some aspects the application 316 includes a user interface component 318 that, when executed by the processor 304, causes the display device 306 to present a user interface, for example a graphical user interface (GUI) (not shown in FIG. 3). The network interface 308, in some embodiments, is configured to couple the computing device 300 and/or individual components thereof to a network, such as a wired network, a wireless network, a local area network (LAN), a wide area network (WAN), a wireless mobile network, a Bluetooth network, the Internet, and/or another type of network. The input device 310 may be any device by means of which a user may interact with the computing device 300. Examples of the input device 310 include without limitation a mouse, a keyboard, a touch screen, a voice interface, and/or the like. The output module 312 may, in various embodiments, include any connectivity port or bus, such as, for example, a parallel port, a serial port, a universal serial bus (USB), or any other similar connectivity port known to those skilled in the art.

With reference to FIGS. 4A and 4B, the aerial vehicle 102 is shown with the propulsion unit 140 attached thereto by a tether 156 that is wound about the winch 120. The tether 156 may be any rope or cable having suitable tensile properties for supporting the propulsion unit 140 that allows for the propulsion unit 140 to fly in any direction relative to the aerial vehicle 102. The propulsion unit 140 is configured to move along the propulsion flight path 160 (FIG. 4A) or a propulsion path 161 (FIG. 4B) relative to the aerial vehicle 102, since the propulsion unit 140 is tethered thereto. The propulsion flight path 160 may be any cyclical path and may have any suitable shape, such as circular, oval, obround, and combinations thereof. In embodiments, the propulsion flight path 160 may also be any cyclically reversible, e.g., ondulating, flight path that is substantially disposed along a swing plane 163.

As the propulsion unit 140 moves along the propulsion flight path 160 (FIG. 4A) or the propulsion path 161 (FIG. 4B), the propulsion unit 140 generates lift. The lift vector of the propulsion unit 140 is controlled by adjusting the direction of propulsion unit 140, which in turn allows for controlling steering and propulsion of the aerial vehicle along the vehicle flight path 162 at a set speed and direction. With respect to the embodiment of FIG. 4B, the lift vector of the propulsion unit 140 is substantially transverse to the swing plane 163 and is used to point, and thus, steer the aerial vehicle 102. Thus, the flight path 162 is also substantially transverse with respect to the swing plane 163.

Figure 5:
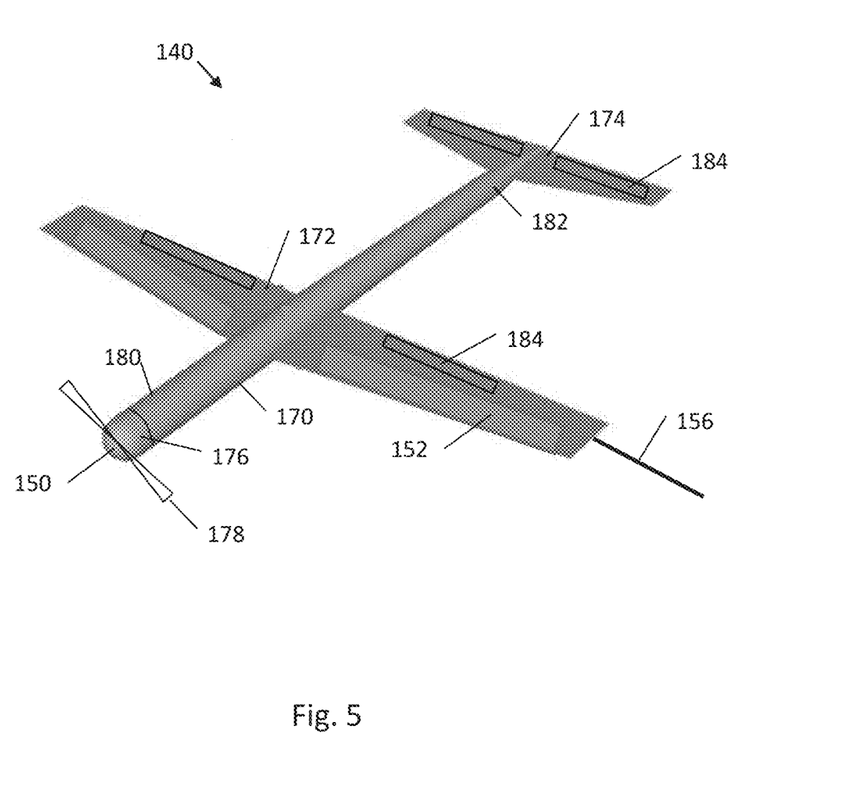
FIG. 5 is a perspective view of a propulsion unit of the aerial vehicle system of FIG. 1 in accordance with an embodiment of the present disclosure.

With reference to FIG. 5, the propulsion unit 140 includes a fuselage 170, a primary airfoil 172, e.g., a pair of wings, a secondary airfoil 174, e.g., a tail, and the thruster 150. In embodiments, the secondary airfoil 174 may include a stabilizer. The primary airfoil 172 may be disposed at about the midpoint of the fuselage 170 and is attached to the tether 156. The secondary airfoil 174 is disposed at a second, e.g., rear, end 182 of the fuselage 170, which is opposite of a first, e.g., front, end 180.

The thruster 150 may be a micro propeller powered by an electrical motor 176 and a propeller 178, which is coupled to and rotatable by the electrical motor 176. The electrical motor 176 and the propeller 178 are disposed at the first end 180 of the fuselage 170 and provide propulsion to the propulsion unit. In this configuration, the thruster 150 operates in a tractor configuration, such that the propulsion unit 140 is pulled through the air. The electrical motor 176 may be powered by the energy storage 146, which stores electrical energy generated by the solar panels 152. The solar panels 152 may be on any portion of propulsion unit 140, e.g., on the primary airfoil 172 and/or the secondary airfoil 174. In exemplary embodiments, the thruster 150 may be disposed at the second end 182, and would be configured in a pusher configuration, such that the propulsion unit 140 is pushed through the air.

Each of the primary airfoil 172 and the secondary airfoil 174 may include one or more ailerons 184 that may be used to control direction of the propulsion unit 140. As described above in FIG. 2, the propulsion controller 144 is configured to operate the flight controls 148, which include the thruster 150 and the ailerons 184, to control the flight of the propulsion unit 140. This includes operating the flight controls 148 to guide to propulsion unit 140 along the propulsion flight path 160 to achieve a desired speed and/or direction of the propulsion unit 140, to generate lift and by extension, propel the aerial vehicle 102 along the vehicle flight path 162.

The sensors 142 of the propulsion unit 140 measure various flight data parameters, such as air pressure, wind velocity, etc. The sensors 142 transmit this data to the vehicle controller 126 and/or the propulsion controller 144, which then make adjustments to the propulsion flight path 160 and/or the vehicle flight path 162.

The propulsion unit 140 may move in any cyclical flight path having any suitable shape, e.g., obround, oval, circular, and combinations thereof etc., as shown in FIG. 4A. The pitch, roll, and yaw of the propulsion unit 140 may be varied during the propulsion flight path 160 by adjusting any or all of the ailerons 184 disposed on the primary and secondary airfoils 172 and 174 as well as the thruster 150. In embodiments, the propulsion flight path 160 may be adjusted by controlling the direction as well as velocity of the propulsion unit 140. In other words, the propulsion controller 144 would instruct the flight controls 148 of the propulsion unit 140 to execute half a loop at each end to generate a cyclical pattern.

Alternatively, the propulsion unit 140 may move along a cyclically reversible undulating propulsion flight path 161. The propulsion flight path 161 may be adjusted by controlling the thruster 150 such that the propulsion unit 140 undulates along the propulsion flight path 161. It is envisioned that ailerons 184 may also be adjusted to ensure that the propulsion unit 140 stays within the swing plane 163. The thruster 150 may be operated in a cyclical manner such that the thruster 150 switches between tractor and pusher configurations. In order to propel the propulsion unit 140 along the propulsion flight path 161, the thruster 150 is operated at a variable speed to ensure that the velocity and acceleration vectors of the propulsion unit 140 correspond to the undulating trajectory of the propulsion flight path 161. Thus, as the propulsion unit 140 is approaching either end of the propulsion flight path 161, the velocity of the propulsion unit 140 approaches zero. At these points, the thruster 150 reverses the direction of the thrust (e.g., switches between the tractor and pusher configurations) to propel the propulsion unit 140 in a reverse direction.

With reference to FIG. 6, another embodiment of a propulsion unit 240 is shown. The propulsion units 140 and 240 may be used interchangeably with respect to the flight paths 160 and 161 of FIGS. 4A and 4B, or any other desired flight paths. Since the propulsion unit 240 is suspended from the aerial vehicle 102, aerodynamic demands on the propulsion unit 240 are different from a conventional aircraft that needs to maintain flight without the aid of another aerial vehicle, e.g., aerial vehicle 102. Accordingly, the propulsion unit 240 may include any number or airfoils having any suitable shape or size designed to achieve directional control and drag reduction of the propulsion unit 140 to achieve flight control of the aerial vehicle 102 rather than of the propulsion unit 140.

The propulsion unit 240 is substantially similar to the propulsion unit 140 of FIG. 5, and only the differences are described below. In particular, the propulsion unit 240 may include a primary airfoil 272 having a single a wing extending from the fuselage 170. In addition, the propulsion unit 240 may include the winch 120 that is coupled to the primary airfoil 272. In exemplary embodiments, the winch 120 may also be coupled to the primary airfoil 172 of the propulsion unit 140.

Various operational parameters of the propulsion unit 140 or 240, such as tether extension, direction and speed of the propulsion flight path 160 may be controlled remotely in order to move the aerial vehicle 102 to a desired destination. Commands to the propulsion unit 140 may be sent from the computing devices 104 through the vehicle controller 102 or directly to the propulsion controller 144. Commands may include GPS coordinates to instruct the aerial vehicle 102 to move to a desired location. The vehicle controller 126 would then communicate with the propulsion controller 144 to achieve the desired positioning of the aerial vehicle 102 by moving the propulsion unit 140 or 240 along the propulsion flight path 160 to generate movement, e.g., desired speed and direction, along the vehicle flight path 162. Thus, the vehicle controller 126, upon receiving movement commands from the computing devices 104, is configured to generate propulsion commands for the propulsion unit 140 or 240 to move the aerial vehicle 102 along the vehicle flight path 162. In embodiments, the vehicle controller 126 and/or the propulsion controller 144 may control the winch 120 to adjust the distance of the tether 156 to make additional adjustments to the propulsion flight path 160 since the length of the tether 156 directly affects the length of the propulsion flight path 160.

In embodiments, in addition to being used to generate desired movement, the propulsion unit 140 or 240 may be also used as a sail to guide the aerial vehicle 102 using wind currents. In further embodiments, the propulsion unit 140 or 240 may be used as an anchor to counteract any movement of the aerial vehicle 102 due to atmospheric conditions, e.g., currents. In these embodiments, the propulsion unit 140 or 240 is lowered into lower reaches of the atmosphere and the flight controls 148 are used to maintain the position and orientation of the propulsion unit 140 or 240 relative to the wind current depending on the desired effects of the winds (e.g., to minimize or maximize the surface area of the primary airfoil 272 or the primary and secondary airfoils 172 and 174 exposed to the wind).

As can be appreciated in view of the present disclosure, the systems and methods described herein provide advancements in aerial vehicle propulsion. The disclosed system minimizes the need for multiple thrust generating devices by using a single thruster to move the aerial vehicle in any desired direction. The present disclosure also provides for a low cost and low weight propulsion system that can be integrated within the existing framework of any buoyant aerial vehicle system by being suspended from the payload. In addition, the disclosed propulsion unit has minimal power requirements for generating propulsion, which leverages atmospheric conditions, e.g., wind, and/or momentum to move the balloon. Furthermore, the configuration of the propulsion unit provides for additional surface area for mounting solar panels.

The embodiments disclosed herein are examples of the present systems and methods and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present information systems in virtually any appropriately detailed structure. Like reference numerals may refer to similar or identical elements throughout the description of the figures.

The phrases "in an embodiment," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The systems and/or methods described herein may utilize one or more controllers to receive various data and transform the received data to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms. In exemplary embodiments that employ a combination of multiple controllers and/or multiple memories, each function of the systems and/or methods described herein can be allocated to and executed by any combination of the controllers and memories.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more non-transitory computer-readable or machine-readable media or memory. The term "memory" may include a mechanism that provides (in an example, stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

The foregoing description is only illustrative of the present systems and methods. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A buoyant aerial vehicle comprising:
a balloon configured to store a gas, wherein the balloon is a superpressure balloon having a ballonet therein;
a first controller configured to manage airflow into and out of the ballonet to adjust an altitude of the balloon;
a payload coupled to the balloon; and
a propulsion unit coupled to the payload by a tether, the propulsion unit including:
a fuselage having a a-first end and a second end opposite the first end;
a thrust generating device disposed at one of the first end or the second end and configured to move the propulsion unit relative to the payload along a propulsion flight path, such that movement of the propulsion unit imparts movement of the buoyant aerial vehicle along a vehicle flight path; and
a second controller operatively coupled to the thrust generating device and to the first controller, the second controller being configured to control at least one of a direction and a velocity of the propulsion unit for the propulsion flight path in order to move the buoyant aerial vehicle along the vehicle flight path.

2. The buoyant aerial vehicle according to claim 1, wherein the tether is coupled to either the first end of the fuselage or to a primary airfoil of the propulsion unit.

3. The buoyant aerial vehicle according to claim 1, wherein the propulsion unit is disposed relative to the tether so that the propulsion unit is able to orient in a selected direction relative to the payload.

4. The buoyant aerial vehicle according to claim 2, wherein the primary airfoil includes at least one aileron.

5. The buoyant aerial vehicle according to claim 1, further comprising at least one solar panel coupled to the payload or the balloon.

6. The buoyant aerial vehicle according to claim 1, wherein the second controller is a propulsion controller configured to actuate the thrust generating device to move the propulsion unit relative to the payload along the propulsion flight path.

7. The buoyant aerial vehicle according to claim 1, wherein the thrust generating device includes an electrical motor and a propeller rotatable by the electrical motor.

8. The buoyant aerial vehicle according to claim 1, wherein the second controller is configured to receive a movement command including at least one of a destination, direction, or speed for moving the buoyant aerial vehicle along the vehicle flight path.

9. The buoyant aerial vehicle according to claim 1, wherein at least one of the first controller or the second controller is configured to determine the propulsion flight path that propels the buoyant aerial vehicle along the vehicle flight path.

10. The buoyant aerial vehicle according to claim 1, wherein the second controller is configured to control an airfoil the thrust generating device.

11. The buoyant aerial vehicle according to claim 1 wherein the propulsion unit further includes a sensor configured to measure at least one flight property of the propulsion unit.

12. The buoyant aerial vehicle according to claim 11, wherein the sensor is configured to transmit a measurement value corresponding to the at least one flight property to at least one of the first controller or the second controller.

13. The buoyant aerial vehicle according to claim 1, wherein the payload includes a communication module configured to provide telecommunication services.

14. The buoyant aerial vehicle according to claim 1, further comprising an energy storage module, wherein the propulsion unit is powered by energy stored in the energy storage module.

15. The buoyant aerial vehicle according to claim 1, wherein the buoyant aerial vehicle is an airship.

16. The buoyant aerial vehicle according to claim 1, wherein the buoyant aerial vehicle is configured to float at an altitude in the atmosphere where a density of the buoyant aerial vehicle is equal to a density of the atmosphere.

17. The buoyant aerial vehicle according to claim 1, wherein the second controller is configured to control the at least one of the direction and the velocity of the propulsion unit in accordance with a received maneuver plan.

* * * * *

UNITED STATES PATENT AND TRADEMARK OFFICE
CERTIFICATE OF CORRECTION

PATENT NO.        : 10,780,969 B2
APPLICATION NO.   : 15/850824
DATED             : September 22, 2020
INVENTOR(S)       : Siegfried H. Zerweckh Page 1 of 1

It is certified that error appears in the above-identified patent and that said Letters Patent is hereby corrected as shown below:

In the Claims

Claim 1, Column 12, Line 16:
Now reads "fuselage having a a-first end"; should read -- fuselage having a first end --

Signed and Sealed this
Fifteenth Day of December, 2020

Andrei Iancu
*Director of the United States Patent and Trademark Office*